United States Patent [19]

Takada et al.

[11] Patent Number: 5,034,453
[45] Date of Patent: Jul. 23, 1991

[54] MOISTURE-CURING HOT-MELT SEALANT

[75] Inventors: Masaharu Takada, Osaka; Yoshihiro Nakata, both of Takatsuki, all of Japan

[73] Assignee: Sunstar Giken Kabushiki Kaisha, Osaka, Japan

[21] Appl. No.: 467,418

[22] Filed: Jan. 19, 1990

[51] Int. Cl.$^5$ .................... C08G 18/66; C08L 75/06
[52] U.S. Cl. ..................... 524/590; 525/440
[58] Field of Search .................... 525/440; 524/590

[56] References Cited

U.S. PATENT DOCUMENTS 4,443,577 4/1984 Higgins ................... 524/590

OTHER PUBLICATIONS

*The Condensed Chemical Dictionary, Eighth Edition,* Van Nostrand Reinhold Company, 1971, p. 591.

*Primary Examiner*—Patricia Short
*Attorney, Agent, or Firm*—Wegner, Cantor, Mueller & Player

[57] ABSTRACT

A moisture-curing hot-melt sealant which comprises a polyurethane prepolymer which is prepared by reacting (a) a polyol component comprising a mixture of a thermoplastic saturated polyester polyol having a hydroxyl group at the terminus and having a molecular weight of 8,000 to 25,000 and a thermoplastic or liquid polyol having a hydroxyl group at the terminus and having a molecular weight of not more than 5,000 which is compatible with the thermoplastic saturated polyester polyol in a ratio of 1:1 to 1:8 by mole, and (b) a polyisocyanate compound having two or more isocyanate groups in the molecule thereof in an equivalent ratio of isocyanate group/hydroxyl group of 1.4 to 3 in admixture with the conventional additives. Said sealant has excellent heat resistance and initial properties and is suitable for adhering, for example, window glass of automobiles, particularly in cold district.

6 Claims, No Drawings

MOISTURE-CURING HOT-MELT SEALANT

This invention relates to a moisture-curing hot-melt sealant, more particularly, to a moisture-curing hot-melt sealent containing a polyurethane prepolymer which is easily adhered by contact bonding at a comparatively lower temperature and has excellent heat resistance and initial properties (e.g. strength, elongation, modulus) and is suitable for adhering, for example, window glass of automobiles.

PRIOR ART

The conventional hot-melt sealants, particularly sealants comprising a moisture-curing hot-melt polymer have some defects such as (i) one sealant being able to be adhered by contact bonding at a comparatively lower temperature but having less cohesive force in the uncured state and less initial properties, and (ii) another sealant having excellent cohesive force in the uncured state and excellent initial properties but being unable to be adhered by contact bonding at a comparatively lower temperature.

The moisture-curing hot-melt one part (i.e., one package) polyurethane sealant, which is used, particularly, for off-line automobiles in automobile production factories, suffers from various shocks and vibrations due to opening and closing of doors, etc. in the incompletely cured state, and when the automobiles are stocked outdoors about 2 hours after the window glasses are fitted, or when the automobiles are stocked outdoors at winter, the sealant is more solidly cured. Accordingly, under severe conditions as, for example, in the North American region, it is required to develop an improved moisture-curing hot-melt sealant which has improved properties in the initial properties and in the adhesion by contact bonding at a lower temperature.

It is known that a hot-melt polymer comprising thermoplastic saturated polyester is controlled as to the molecular weight in the range of 10,000 to 30,000 for the purpose of improving the heat resistance and has satisfactory initial properties, but this polymer has a very high melting temperature, and hence, the hot-melt sealant comprising such a hot-melt polymer can not practically be used under the severe conditions as mentioned above and further is inferior in the adhesion.

On the other hand, it is also known that a moisture-curing hot-melt polymer comprising a prepolymer prepared by reacting a themoplastic polyester polyol with a polyisocyanate has a lower melting temperature and excellent heat resistance after crosslinking but has inferior initial properties, and hence, the moisture-curing hot-melt can still not practically be used in view of the inferior initial properties.

BRIEF DESCRIPTION OF THE INVENTION

The present inventors have intensively studied an improved moisture-curing hot-melt sealant having no defects as mentioned above and have found that in a polyurethane prepolymer prepared by reacting a specific polyol mixture comprising a high molecular weight polyol component and a low molecular weight polyol component which are compatible with each other with an excess amount of a polyisocyanate component, the high molecular weight polyol component contributes to in the initial properties of the sealant and the low molecular weight polyol component is effective in the lowering of the melting temperature of the high molecular weight polyol component and then when both polyol components are controlled in a specific molar ratio, both properties are effectively exhibited to give the desired moisture-curing hot-melt sealant having excellent heat resistance and excellent adhesion.

An object of the invention is to provide an improved moisture-curing hot-melt sealant having excellent heat resistance and initial properties and being able to be adhered by contact bonding at a comparatively lower temperature. Another object of the invention is to provide a moisture-curing hot-melt sealant suitable for adhesion of substrates in a cold invironment, particularly for adhesion of window glass of automobiles in a cold invoronment. These and other objects and advantages of the invention will be apparent to those skilled in the art from the following description.

DETAILED DESCRIPTION OF THE INVENTION

The moisture-curing hot-melt sealant of the invention comprises a polyurethane prepolymer which is prepared by reacting (a) a polyol component comprising a mixture of a thermoplastic saturated polyester polyol having a hydroxyl group at the terminus and having a molecular weight of 8,000 to 25,000 (hereinafter, referred to as "high molecular weight polyol") and a thermoplastic or liquid polyol having a hydroxyl group at the terminus and having a molecular weight of not more than 5,000 which is compatible with the high molecular weight polyol (hereinafter, referred to as "low molecular weight polyol") in a ratio of 1 : 1 to 1 : 8 by mole, and (b) a polyisocyanate compound having two or more isocyanate groups in the molecule thereof in an equivalent ratio of isocyanate group/hydroxyl group of 1.4 to 3.

The thermoplastic saturated polyester polyol used in the present invention has a molecular weight of 8,000 to 25,000, preferably 15,000 to 20,000. When the molecular weight is lower than 8,000, the product obtained therefrom is inferior in the initial properties and has a lower melting point, and on the other hand, when the molecular weight is higher than 25,000, the product has a disadvantageously high melting point, while it has excellent initial properties. The high molecular weight polyol is prepared by reacting a dicarboxylic acid and a diol. The dicarboxylic acid includes, for example, aromatic dicarboxylic acids or anhydrides or esters thereof (e.g. terephthalic acid, isophthalic acid, dimethyl terephthalate, diethyl terephthalate, phthalic anhydride, methyl-hexahydrophthalic acid, methyl-hexahydrophthalic anhydride, methyl-tetrahydrophthalic acid, methyl-tetrahydrophthalic anhydride, hexahydrophthalic acid, hexahydrophthalic anhydride, tetrahydrophthalic acid, etc.), aliphatic dicarboxylic acids or anhydrid,es thereof (e.g. succinic acid, succinic anhydride, glutaric acid, adipic acid, azelaic acid, sebacic acid, decanedicarboxylic acid, octadecanedicarboxylic acid, dimeric acid, fumaric acid, etc.), alicyclic dicarboxylic acids (e.g. 1,3-cyclohexanedicarboxylic acid, 1,4-cyclohexanedicarboxylic acid, etc.). The diol compound includes, for example, ethylene glycol, 1,2-propanediol, 1,3-propanediol, 1,3-butanediol, 1,5-pentanediol, 1,6-hexanediol, 1,10-decanediol, neopentyl glycol, diethylene glycol, polyethylene glycol, dipropylene glycol, polypropylene glycol, 1,4-cyclohexanedimethanol, 1,4-cyclohexanediol, bisphenol A, bisphenol F, hydrogenated bisphenol A, hydrogenated bisphenol F, etc. The high molecular weight polyols can be used alone or in combination of two or more thereof.

The thermoplastic or liquid polyol to be mixed with the high molecular weight polyol has a molecular weight of not higher than 5,000, preferably 3,000 to 5,000. When the molecular weight thereof is over 5,000, it does not exhibit sufficient effect for lowering the melting point of the high molecular weight polyol. The low molecular weight polyol includes polyether polyols, polyester polyols, hydroxyl group-containing polybutadiene polyols, acrylic polyols, castor oil derivatives, tall oil derivatives, and the like.

The above polyether polyols, i.e. polyoxyalkylene ether polyols, include polyoxyethylene-propylene polyols which are random or block copolymers prepared by subjecting propylene oxide and ethylene oxide to ring opening polymerization in the presence of one or more of a low molecular weight active hydrogen compound having two or more active hydrogen atoms; and polyoxytetramethylene glycols prepared by subjecting tetrahydrofuran to ring opening polymerization, said polyols containing two or three hydroxyl groups in the molecule thereof. The low molecular weight active hydrogen compound includes diols (e.g. ethylene glycol, propylene glycol, butylene glycol, 1,6-hexanediol, etc.), triols (e.g. glycerin, trimethylolpropane, 1,2,6-hexanetriol, etc.), and amines (e.g. ammonia, methylamine, ethylamine, propylamine, butylamine, etc.).

The above polyester polyols are usually prepared by reacting a polybasic acid and a polyhydric alcohol or by subjecting a polyhydric alcohol and $\epsilon$-caprolactone to ring opening polymerization and contain a hydroxyl terminus. The polybasic acid includes phthalic acid, adipic acid, terephthalic acid, isophthalic acid, sebacic acid, dimerized linoleic acid, maleic acid, and di-lower alkyl esters of these polybasic acids. The polyhydric alcohol includes the diols and triols as mentioned above, and further includes diethylene glycol, triethylene glycol, dipropylene glycol, tripropylene glycol, and the like.

Among these low molecular weight polyols, there is selected the most suitable polyol which is compatible with the above high molecular weight polyols. The low molecular weight polyols are used alone or in combination of two or more thereof.

These polyols are used in a molar ratio of the high molecular weight polyol : the low molecular weight polyol of 1 : 1 to 1 : 8, preferably 1 : 2 to 1 : 3. When the low molecular weight polyol is used in a ratio of less than 1 : 1 by mole, the effect of the low molecular weight polyol for lowering the melting point of the high molecular weight polyol is not sufficiently exhibited, and on the other, when the amount of the low molecular weight polyol is more than the ratio of 1 : 8, the effect of thereof for improving the initial properties of the high molecular weight polyol is not exhibited.

The compound containing two or more isocyanate groups in the molecule (hereinafter, referred to as "polyisocyanate compound") used in the present invention includes, for example, trimethylene diisocyanate, tetramethylene diisocyanate, hexamethylene diisocyanate, pentamethylene diisocyanate, 2,4,4- or 2,2,4-trimethylhexamethylene diisocyanate, dodecamethylene diisocyanate, 1,3-cyclopentane diisocyanate, 1,4-cyclohexane diisocyanate, 1,3-cyclohexane diisocyanate, 4,4'-methylenebis(cyclohexyl isocyanate), methyl 2,4-cyclohexanediisocyanate, methyl, 2,6-cyclohexanediisocyanate, 1,4-bis(isocyanatomethyl) -cyclohexane, 1,3-bis(isocyanatomethyl)cyclohexane, m- phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, dianilidine diisocyanate, 4,4'-diphenyl ether diisocyanate, 1,3- or b 1,4-xylylene diisocyanate, $\omega,\omega'$-diisocyanato-1,4-diethylbenzene, and the like, which are used alone or in combination of two or more thereof.

The reaction of the mixture of the high molecular weight polyol and the low molecular weight polyol with the polyisocyanate compound is carried out under usual conditions, for example, by heating at a temperature of 100° to 140° C. for 3 to 5 hours. The reaction components are used in an equivalent ratio of an isocyanate group/hydroxyl group of 1.4 to 3, preferably 2.0 to 2.4. When the ratio is less than 1.4, the polyurethane prepolymer thus prepared has inferior storage stability (increasing in viscosity), and on the other hand, when the ratio is over 3, the final sealant product has disadvantageously lower resistance to foaming.

The moisture-curing hot-melt sealant of the present invention is characteristic in that the polyurethane prepolymer is contained as the main component, but it can contain other conventional components in an appropriate amount. Preferable examples of the sealant of the present invention comprise 20to 80% by weight, more preferably 30to 60% by weight, of a polyurethane prepolymer; not more than 50% by weight, more preferably 15 to 30% by weight, of a filler; not more than 30% by weight, more preferably not more than 15% by weight, of a plasticizer; and optionally not more than 30% by weight, more preferably not more than 15% by weight, of a thixotropic agent, and not more than 30% by weight, more preferably not more than 10% by weight, of other additives.

When the amount of the polyurethane prepolymer is less than 20% by weight, the product is inferior in both the adhesion and physical properties, and on the other hand, when the amount is over 80% by weight, the product tends to have inferior resistance to foaming.

The filler includes silicic acid derivatives, talc, metal powders, calcium carbonate, clay, carbon black, and the like. When the filler is used in an amount of less than 15% by weight, the product has too slow curing speed and has inferior physical properties, and on the other hand, when the amount of the filler is over 50% by weight, the product has too high viscosity which is not suitable for use as a sealant and tends to have inferior adhesion and physical properties.

The plasticizer includes dibutyl phthalate, dioctyl phthalate, 2-ethylhexyl phthalate, dicyclohexyl phthalate, diisooctyl phthalate, diisodecyl phthalate, dibenzyl phthalate, butyl benzyl phthalate, trioctyl phosphate, epoxy resin plasticizers, toluenesulfonamide, chloroparaffin, adipic acid esters, castor oil derivatives, and the like. When the plasticizer is used in an amount of more than 30% by weight, the product tends to have inferior adhesion and initial properties.

The thixotropic agent includes Bentone, silicic anhydride, silicic derivatives, urea derivatives, and the like. When the thixotropic agent is used in an amount of more than 30% by weight, the product tends to be inferior in characteristics and physical properties as required for a sealant.

The other additives include dyes and pigments, curing catalysts, ultraviolet absorbents, tackifiers, flame-retardants, silane compounds, dehydrating agents, and the like. When the other additives are used in an amount of more than 30% by weight, the product tends to be inferior in characteristics and physical properties as required for a sealant.

The present invention is illustrated by the following Example and Reference Example but should not be construed to be limited thereto.

EXMAPLE 1

(1) Preparation of polyurethane prepolymer

A thermoplastic saturated polyester polyol having a molecular weight of 20,000 (terephthalic polyol, glass transition temperature: 3° C.) (100 parts by weight) is heated at 160° C. with a heating kneader and thereto is added a liquid polyester polyol having a molecular weight of 2,000 (New Ace F7-67, manufactured by Asahi Denka Kogyo K.K.) (30 parts by weight) and further added adipic acid ester plasticizer (50parts by weight). The mixture is stirred to defoam at 140° C. for one hour. The reaction mixture is cooled to 120° C. and thereto is added 4,4'-diphenylmethane diisocyanate (10 parts by weight), and the mixture is stirred to defoam at 120° C. The reaction is continued until the isocyanate content of the product comes to a constant level (about 1.1 %) to give a polyurethane prepolymer solution.

(2) Preparation of sealant

To the polyurethane prepolymer solution obtained above (599 parts by weight) is added carbon black (400 parts by weight, as a filler) which is previously dried at 200° C., and the mixture is heated with stirring for 30 minutes and then further stirred to defoam for 30 minutes. To the reaction mixture is added 5% solution of dibutyl tin dilaurate in dioctyl phthalate (5 parts by weight), and the mixture is heated with stirring to defoam to give a sealant.

REFERENCE EXAMPLE 1

A commercially available one part, moisture-curing urethane sealant (Betaseal #551, manufactured by Sunstar Giken K.K., Japan) is used.

Both sealants were each applied to a substrate to give test pieces, wherein the sealant of Example 1 was applied in the molten state at 120° C. and the sealant of Reference Example 1 was applied at room temperature. These test pieces were subjected to tests of the initial shear strength (at room temperature, and at a lower temperature) and the initial elongation (at room temperature, and at a lower temperature). The results are shown in Table 1.

TABLE 1

| Test items | | Example 1 | Ref. Ex. 1 |
|---|---|---|---|
| Initial shear strength (kg/cm²) | Room temp.* | 15 | 1.5 |
| | Low temp.** | 18 | 0.5 |
| Initial elongation | Room temp.* | 400 | unmeasured |
| | Low temp.** | 300 | unmeasured |

TABLE 1-continued

| Test items | Example 1 | Ref. Ex. 1 |
|---|---|---|
| (%) | | |

*It was measured at 20° C., 65% relative humidity 2 hours after application.
**It was measured at 5° C., 50% relative humidity 2 hours after application.

In the above experiment, each test was carried out as follows.

(1) Test of initial shear strength

The sealant to be tested was applied to a steel panel (width, 25 mm) in an area of 10 mm×25 mm in a thickness of 5 mm, and thereon a glass plate (width, 25 mm) was piled, and after keeping the test piece under the conditions as shown in the above table, the glass plate was drawn at a rate of 500 mm/min., and the data are shown by the maximum strength when the test piece was broken.

(2) Test of initial elongation

This test was carried out in the same manner as defined in JIS K 6301 by using 2# Dummbbell specimen (thickness, 2 mm) at a drawing rate of 500 mm/min., and the elongation ratio at break was measured.

What is claimed is:

1. A moisture-curing hot-melt sealant which comprises a polyurethane prepolymer which is prepared by reacting (a) a polyol component comprising a mixture of a thermoplastic saturated polyester polyol having a hydroxyl group at the terminus and having a molecular weight of 8,000 to 25,000 and a thermoplastic or liquid polyol having a hydroxyl group at the terminus and having a molecular weight of not more than 5,000 which is compatible with the thermoplastic saturated polyester polyol in a ratio of 1 : 1 to 1 : 8 by mole, and (b) a polyisocyanate compound having two or more isocyanate groups in the molecule thereof in an equivalent ratio of isocyanate group/hydroxyl group of 1.4 to 3.

2. The sealant according to claim 1, which comprises 20 to 80 % by weight of the polyurethane prepolymer, not more than 50 % by weight of a filler, not more than 30 % by weight of a plasticizer, and not more than 30% by weight of other additives.

3. The sealant according to claim 1, wherein the thermoplastic saturated polyester polyol has a molecular weight of 15,000 to 20,000 and the thermoplastic or liquid polyol has a molecular weight of 3,000 to 5,000.

4. The sealant according to claim 1, wherein the polyol component comprises a mixture of the thermoplastic saturated polyester polyol and the thermoplastic or liquid polyol in a molar ratio of 1 : 2 to 1 : 3.

5. The sealant according to claim 1, wherein the polyol component and the polyisocyanate compound are reacted in an equivalent ratio of isocyante group/hydroxyl group of 2.0 to 2.4.

6. The sealant according to claim 1, which comprises 30 to 60% by weight of the polyurethane prepolymer, 15 to 30% by weight of a filler, not more than 15% by weight of a plasticizer, not more than 15 % by weight of a thixotropic agent, and not more than 10% by weight of other additives.

* * * * *